Dec. 19, 1922.
C. S. WALDO.
COMPOSITE HEAT INSULATION FOR PIPING.
FILED SEPT. 30, 1918.
1,439,653.
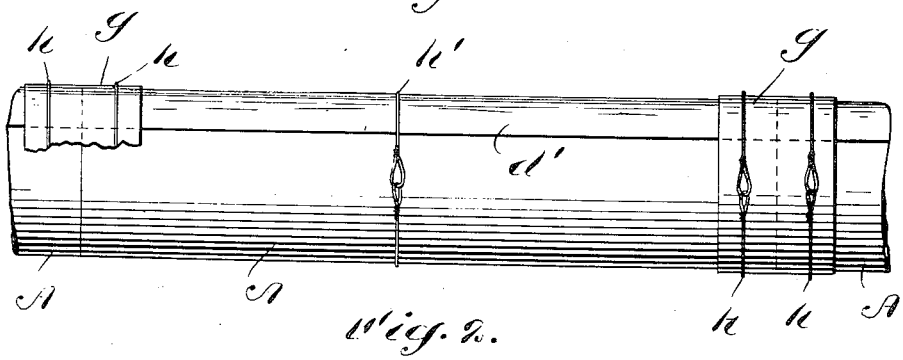
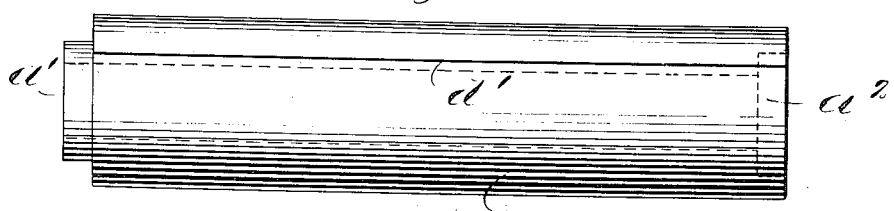
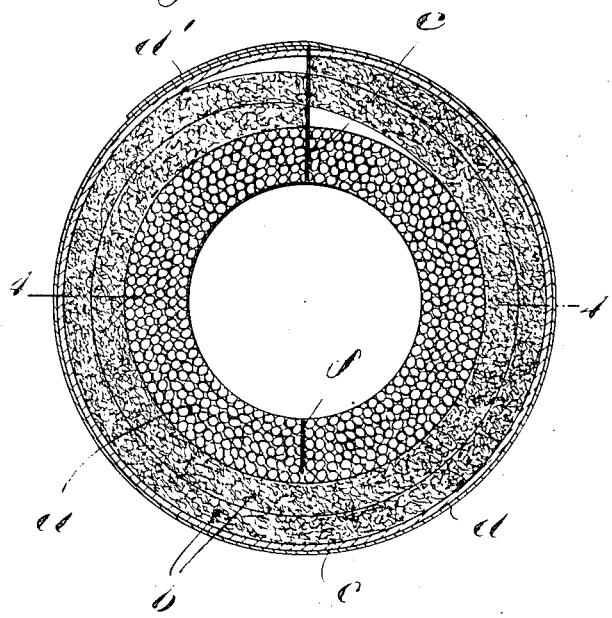
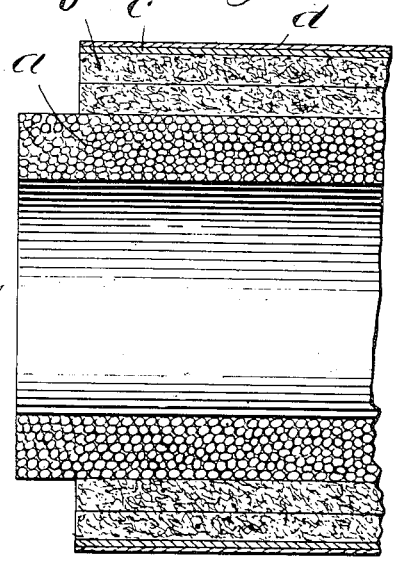
Inventor:
Charles S. Waldo,
by Merritt & Cushman
Attys Patented Dec. 19, 1922.

1,439,653

UNITED STATES PATENT OFFICE.

CHARLES S. WALDO, OF BROOKLINE, MASSACHUSETTS, ASSIGNOR TO WALDO BROTHERS, INCORPORATED, OF BOSTON, MASSACHUSETTS, A CORPORATION OF MASSACHUSETTS.

COMPOSITE HEAT INSULATION FOR PIPING.

Application filed September 30, 1918. Serial No. 256,298.

*To all whom it may concern:*

Be it known that I, CHARLES S. WALDO, citizen of the United States of America, and resident of Brookline, in the county of Norfolk and State of Massachusetts, have invented new and useful Improvements in Composite Heat Insulations for Piping, of which the following is a specification.

This invention relates to composite heat insulation for piping, and more particularly to a novel and improved insulation, in sectional form, which may be supplied readymade to be quickly and easily applied to piping by unskilled labor, and which may also be removed without destroying it.

Piping through which a hot or a cold medium is to be conveyed from a central plant to a distant point is usually covered by a heat insulating material, and its proper and economical insulation is important whether the piping is carried above ground or under ground, and whether it carries steam or other hot medium, as for heating or for power, or a cold medium, as for refrigeration. It has hitherto been the practice so far as I am aware to apply to the pipes, after they are installed, sheets of suitable insulating material thus constructing the insulating casing at the plate where it is to be applied. This involves a large amount of labor, and labor possessing a substantial degree of skill, and also results in the loss of material in the cutting up of sheets to fit the particular job. Furthermore as the work often has to be done in inaccessible places or under difficult conditions, imperfect insulation of the pipes is likely to result.

It is among the objects of the present invention to provide a composite heat insulation in sections, ready-made to be conveniently and easily applied to piping by unskilled labor; to make the sections of such form that there will be no loss of insulating efficiency at the ends where the sections join together; to render the insulation waterproof when installed on a pipe; and otherwise to improve the construction, effectiveness, and ease of application of pipe insulations.

In the accompanying drawings which illustrate the invention—

Figure 1 is an elevation of a length of pipe insulation made up of my composite insulating sections;

Figure 2 is an elevation of one of the sections;

Figure 3 is a cross section on an enlarged scale; and

Figure 4 is a longitudinal section on line 4—4 of Fig. 3.

Each composite heat insulating section A is made in tubular form to fit around the pipe for which it is intended. The sections may be made up and carried in stock to fit standard size pipes, or the section could be especially made for unusual sizes or shapes, of piping. As shown in the drawings each section is preferably made up of an inner tubular layer $a$ of a material known as asbestos air cell, such material being substantially rigid or non-flexible in character, an intermediate double layer $b$ of dried eel grass quilting covered on both sides with paper, a layer $c$ of wool felt outside of the quilting $b$, and an outer covering sheet $d$ of waterproof roofing such as felt treated with asphalt. The several layers are permanently secured together as by a suitable cement.

The composite tubular structure thus formed is split or divided lengthwise along one side a cut $e$, and the opposite wall of the section is also severed part way through from the inside as shown at $f$. The outer covering $d$ has one margin adjacent to the cut $e$ extending beyond the cut to form a flap $d'$, which overlaps the joint of the cut when the section is closed around a pipe, and is cemented or otherwise secured to the outside of the section across the cut, thus preventing moisture from entering the cut $e$. In applying the insulation the flap should be positioned as shown, so as to shed water if the device is exposed to the weather.

To apply the section to the pipe it is sprung open lengthwise far enought to permit the pipe to pass through the cut $e$, and then closed around the pipe, and the flap $d'$ is cemented in place. To facilitate opening the section the cut $f$ should be deep enough to permit the inner asbestos layer $a$ to bend. It will not ordinarily be necessary that the cut $f$ be all the way through the layer $a$, or that it should enter the other layers at all as they are of sufficiently flexible material to permit the tube to open without being split.

In order that tight joints between the ends of successive sections A may be insured without loss of insulating qualities the inner layer or tube $a$ is made to project at one end beyond the end of the layers outside, as shown at $a'$ while the other end of the tube $a$ terminates short of the outer layers as shown at $a^2$, thereby forming a tenon at one end of the insulator section and a socket at the other end, adapted to engage respectively a socket and a tenon of similar sections when placed end to end as shown in Fig. 1. The joints between the ends of the sections may then be protected against moisture by a strip of waterproof roofing $g$ wrapped about the insulating section over the joints and secured in place by wires $h$. Similar wires $h'$ in such numbers as may be desired may be fastened about the insulating sections to aid the cemented flap $d'$ in holding the sections closed over the pipe.

Although I have described the layer $a$ as of asbestos air cell, $b$ as of dried eel grass quilting, $c$ as of wool felt, and $d$ as of asphalt roofing and although these materials are, I believe, to be preferred to others, I do not wish to be limited to these particular materials excepting in so far as they are specified in the claims. For example, other materials could be used than asbestos air cell for the inner layer $a$, such as other forms of asbestos fiber, magnesia, or other preferably mineral heat insulating materials suitable to be placed nearest the pipe. In place of dried eel grass quilting $b$, which is recommended because of its exceptional heat insulating properties, some other heat insulating material could be used for the intermediate layer, preferably vegetable fiber because of its low cost and its entire serviceability as it is out of contact with the pipe and therefore not subjected to extreme temperatures. Other materials than wool felt could be used for the layer $c$, or that layer could be omitted altogether; its main functions are to cover and protect the more fragile paper covered quilting $b$, to afford a firm surface on which to cement the outer covering $d$, and also to provide additional heat insulation. And finally any suitable outer covering might be used in place of the waterproof asphalt roofing $d$. The entire structure when assembled and finished as shown in Fig. 1 may be painted if desired to afford it further protection.

I claim:

1. A composite heat insulating section of tubular form comprising a plurality of layers of heat insulating material permanently fastened together, the inner layer being substantially rigid, the intermediate layer flexible and the outer layer waterproof, the wall of the section being divided by a lengthwise cut entirely through one side thereof and into the rigid layer on the opposite side, whereby the section may be opened to be applied to or removed from a pipe.

2. A substantially rigid layer of mineral heat insulating material, an intermediate layer of vegetable-fiber heat insulating material, and an outer covering sheet of waterproofing material, all permanently fastened together, the section being entirely cut through lengthwise upon one side and cut as to its inner layer on the opposite side, whereby the section may be opened to be applied to or removed from a pipe.

3. A complete heat insulating section of tubular form comprising a plurality of layers of heat insulating material permanently fastened together, the wall of said composite tubular section being divided by a lengthwise cut along one side, whereby the section may be opened to be applied to or removed from a pipe, an inner tubular layer projecting at one end beyond the outer walls of the section and terminating at the other end short of the outer walls, thereby forming a tenon at one end and a socket at the other end adapted respectively to engage a socket and a tenon of similar adjoining sections when placed end to end.

4. A composite insulating section of tubular form comprising an inner substantially rigid tube of asbestos fibers, an intermediate insulating member of fiber quilting spirally coiled about said inner tube, and an outer covering sheet of waterproofing material all permanently fastened together, the wall of said composite tubular structure being divided by a lengthwise cut along one side whereby the section may be opened to be applied to or removed from a pipe, said inner tube of asbestos fiber opposite said lengthwise cut being also severed at least part way through from the inside to facilitate the opening of the tubular section.

5. A composite insulating section of tubular form comprising an inner tube of mineral heat insulating material, an intermediate tube of vegetable-fiber heat insulating material, and an outer covering sheet of waterproofing material, all permanently fastened together, the wall of said composite tubular structure being divided by a lengthwise cut along one side whereby the section may be opened to be applied to or removed from a pipe, the inner tube of mineral insulating material projecting at one end beyond the intermediate tube and terminating short of the intermediate tube at the other end, thereby forming a tenon at one end and a socket at the other end adapted respectively to engage a socket and a tenon of similar adjoining sections when placed end to end.

6. A composite insulating section of tubular form comprising an inner asbestos air cell tube, an intermediate insulating tube of dried eel grass quilting, a layer of felt outside of said quilting, and an outer covering sheet of waterproofing material, all permanently fastened together, the wall of said composite tubular structure being divided by a lengthwise cut along one side whereby the section may be opened to be applied to or removed from a pipe, the inner asbestos air cell tube projecting at one end beyond the end of the quilting and terminating short of the end of the quilting at the other end and being severed at least part way through from the inside along a line opposite said cut, and the outer sheet of waterproofing material extending beyond said lengthwise cut to form a flap to overlap the joint of said cut when the section is closed together.

Signed by me at Boston, Massachusetts, this twenty-sixth day of September, 1918.

CHARLES S. WALDO.